Sept. 5, 1939.  F. R. COLLINS  2,171,684
CUTTING APPARATUS
Filed May 4, 1936  2 Sheets-Sheet 1
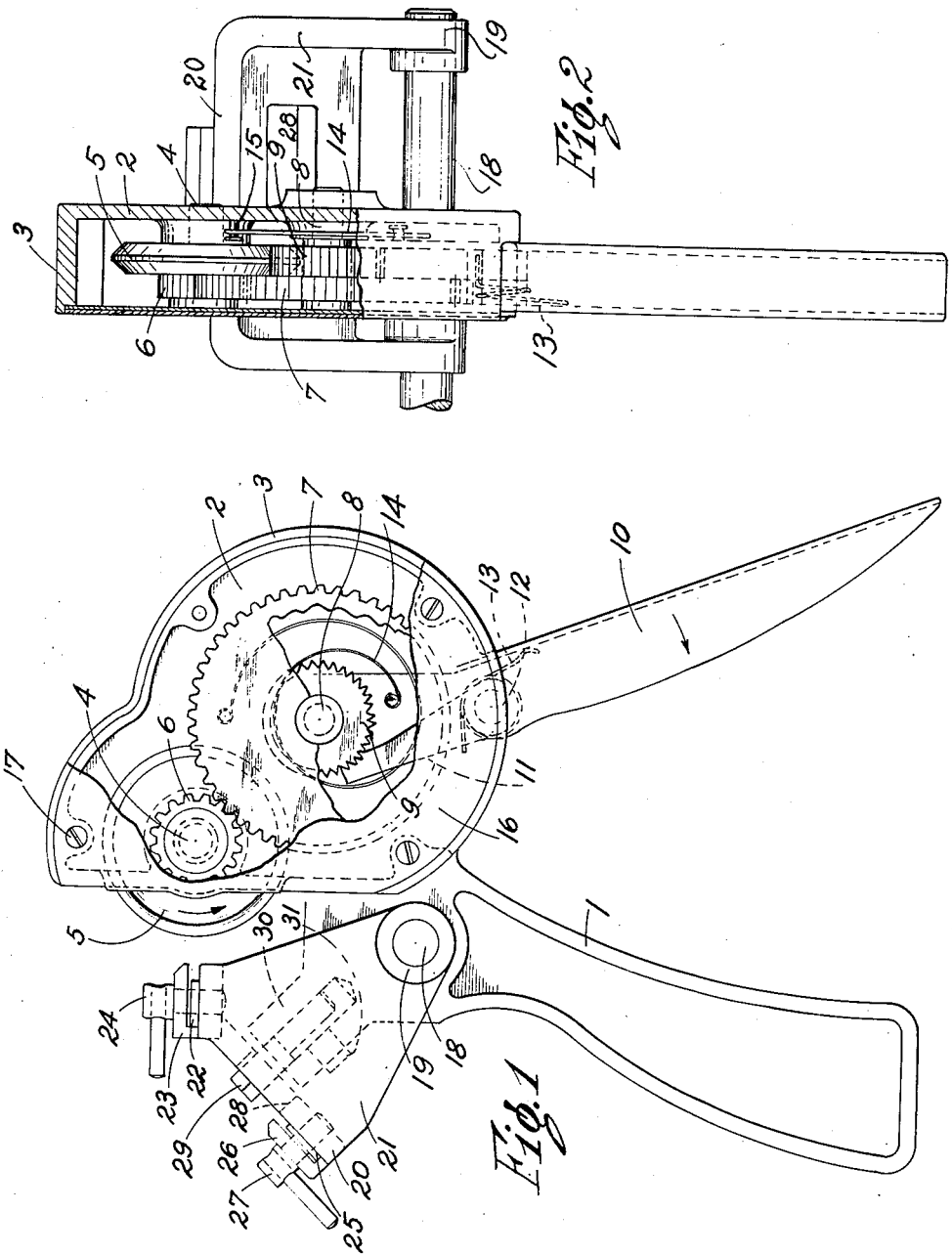
Frank R. Collins, Inventor
By Hawgood and Van Horn, Attorneys Sept. 5, 1939.    F. R. COLLINS    2,171,684
CUTTING APPARATUS
Filed May 4, 1936    2 Sheets-Sheet 2
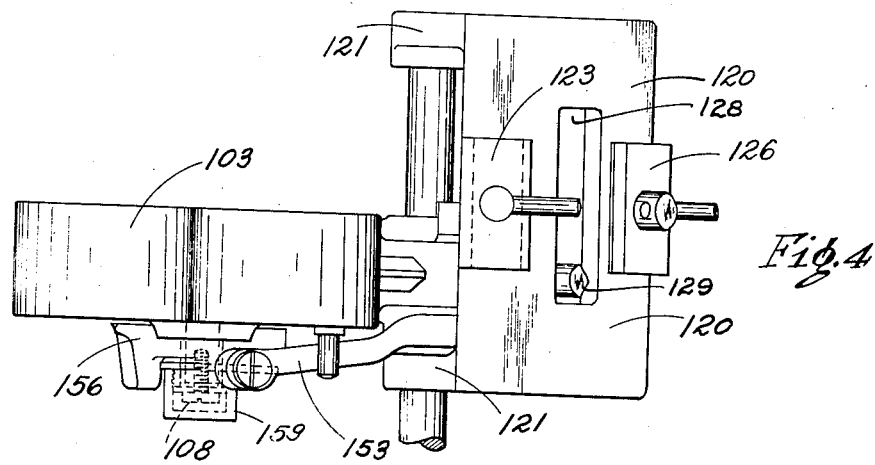
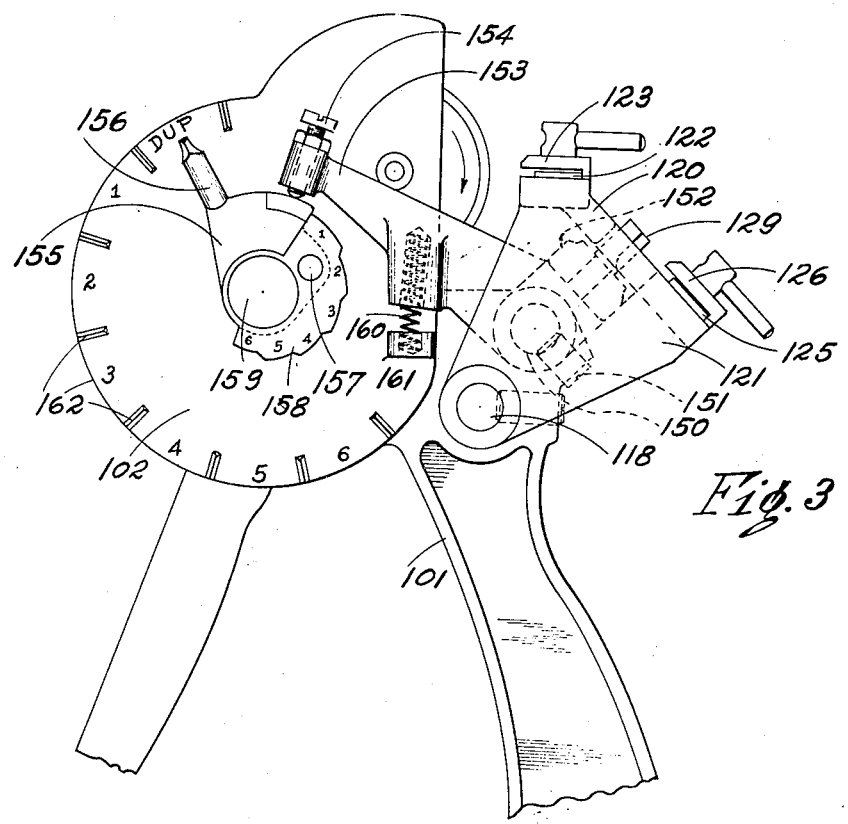
Frank R. Collins, Inventor
By Hawgood and Van Horn, Attorneys Patented Sept. 5, 1939

2,171,684

UNITED STATES PATENT OFFICE 2,171,684

CUTTING APPARATUS

Frank R. Collins, Cleveland, Ohio

Application May 4, 1936, Serial No. 77,675

13 Claims. (Cl. 90—13.05)

This invention relates to cutting apparatus and more particularly to apparatus which is adapted to the production of irregular shapes, such as are found in keys and similar articles.

An object of the invention is to provide an improved cutting apparatus which will quickly produce articles of irregular shape.

Another object is to provide an improved cutting apparatus which will accurately reproduce articles of irregular shape.

Another object is to provide an improved cutting apparatus which may be manually operated.

Another object is to provide an improved cutting apparatus which may be operated with comparatively little energy.

Another object is to provide an improved cutting apparatus which will be simple and rugged in construction.

Another object is to provide an improved cutting apparatus which may be economically manufactured.

Another object is to provide an improved cutting apparatus which will be compact.

Another object is to provide an improved cutting apparatus which will be neat and attractive in appearance.

Another object is to provide an improved cutting apparatus which may be used to produce articles according to a definite plan or code.

Another object is to provide an improved cutting apparatus which may be readily adapted to different plans or codes.

Other objects will hereinafter appear.

The invention will be better understood from the description of two practical embodiments thereof illustrated in the accompanying drawings, in which;

Figure 1 is a side elevational view of one form of apparatus embodying the invention arranged to duplicate keys by using the key to the duplicated as a pattern or templet, parts being broken away and shown in section;

Figure 2 is an end elevational view of the apparatus of Figure 1, parts being broken away and shown in section;

Figure 3 is a side elevational view taken from the opposite side of Figure 1 of a form of apparatus which has been provided with means for cutting keys in accordance with a given code; and Figure 4 is a plan view of the apparatus of Figure 3.

The apparatus shown in Figures 1 and 2 consists of a frame having a handle or grip portion 1 and a housing portion consisting of a flat side or wall plate 2 and a peripheral flange or wall 3, in which housing portion the cutter driving mechanism is positioned.

Within the frame, and journalled upon a shaft 4, is a rotary cutter 5, shown as of double frustroconical shape and provided upon its inclined and cylindrical peripheral surfaces with serrations or cutting teeth which may closely resemble those of a milling cutter, but are preferably of a size comparable with the teeth of a fairly coarse file.

Fixed to this cutter is a pinion gear 6 which meshes with a larger gear 7 rotatably carried upon a shaft 8, and fixed to gear 7 is a ratchet wheel 9 by which this gear may be driven.

A trigger-like lever 10 is likewise pivoted on shaft 8. This lever carries a pawl 11 pivoted to it, as at 12, and urged into engagement with the wheel 9 by a spring 13.

A spring 14 is connected to the lever and to a projection 15 on wall 2 of the frame, and urges the lever to the right, as seen in Figure 1, or in its position most remote from handle 1. The motion away from handle 1 is limited by the end of an opening in peripheral wall 3 through which opening the lever extends.

The gears, ratchet wheel, pawl, springs, end of the lever, and majority of the cutter are all confined within walls 2 and 3 and are protected by a cover plate 16 secured to the frame by screws 17.

It will be seen that when the operator grasps handle 1 and lever 10 in his hand and squeezes them together, with the parts in the position shown in Figure 1, gear 7 is rotated in a clockwise direction, driving gear 6 in a counter-clockwise direction at a much higher speed, thus rotating the cutter rapidly.

The inertia of these parts prevents them from rotating in the opposite direction when the lever is released, so that the spring 14 moves the lever to its most extended position, the pawl to sliding over the teeth of wheel 9 and assuming a position where it may again rotate the wheel when the handle and lever are again moved together.

In this manner, the cutter can be kept constantly rotating and cutting through the metal of a blank pressed against its periphery.

Fixed to the frame is a transversely extending shaft 18 which extends through bearing-like bosses 19 formed in the ends of a channel-shaped carriage, which consists of a central web 20, and depending end flanges 21, the carriage being so mounted that it may be slid axially along shaft 18, or oscillated thereabout toward or from cutter 5.

On the outer surface of web 20 are positioned two vices, one consisting of a stationary jaw 22, a movable jaw 23, and a screw 24 threaded into the flange 20, by which the movable jaws press upon the stationary ones. The other vice has a similar stationary jaw 25, a movable jaw 26, and a screw 27. These vices are arranged symmetrically with respect to the central shaft 18, the first mentioned one being positioned immediately in front of the cutter, and the second being aligned with the first vice and the cutter and facing a slot 28 through the web 20.

Through this slot projects a pin or stop 29 having upon the side facing jaws 25 and 26 a generally V-shaped configuration, which may be inclined with respect to the axis of the pin for a purpose to be hereinafter described.

This pin projects into a recess formed in a boss 30 of the frame and is secured in any desired adjusted position therein by means of a set screw 31.

The apparatus of the first two figures is used as follows:

A key, which is to be duplicated, is inserted and clamped between jaws 25 and 26 and a blank is similarly inserted and clamped between jaws 22 and 23. The operator grasps the handle 1 and the lever 10 in one hand, and, by alternately squeezing these parts together and allowing them to move apart, causes the rotation of the cutter 5.

At the same time, with his other hand, he moves the carriage along shaft 18, pressing it toward the cutter until its further motion in this direction is prevented by the key encountering stop 29. Consequently, he cuts into the blank notches of exactly the same depth as those which are present in the key which he is duplicating.

Inasmuch as the cutter 5 and stop 29 are in alignment with their centers substantially in a single plane normal to the axis of shaft 20, there is no tendency for the carriage to twist upon shaft 18, but the depth of the notches in the key are all faithfully reproduced in the blank.

Should the cutter become worn down, so that it does not cut as deeply into the blank as desired, the stop 29 may be adjusted by moving it in or out of the recess in the frame, and, due to the tapering shape of its contacting edge, will permit the carriage to move more nearly to the cutter before the key engages the stop.

In Figures 3 and 4, an apparatus is shown which has precisely the same type of cutter driving mechanism as that shown in the first two figures.

The frame in this instance consists of a handle 101, a side wall 102, and a marginal wall 103. A shaft 118 is fixed to the frame and carries the carriage consisting of a web 120 and depending flanges 121, this frame being a trifle wider than that which is necessary in the form of apparatus first described, for reasons which will be apparent, but differing in no further essential respect from the frame first described.

Fixed to the frame is a second shaft 150, shown as held in place by a set screw 151, and upon this shaft is journalled a support comprising a channel-shaped portion 152 which carries a stop 129 similar to that fixed to the frame in the first described embodiment.

Formed integrally with the channel-shaped portion is a lever or arm 153, provided at its outer end with a set screw 154, which is arranged to contact the plate of the code mechanism.

This mechanism consists of the carrier 155, pivoted upon an extension of shaft 108 and formed at its end with a pointer and adjusting handle 156.

The support has also a projection or pin 157 adapted to be received into perforation in a cam-like code plate 158, provided on its exterior with stepped surfaces arranged to limit the downward motion of the end of arm 153. This plate is removably retained upon the support 155 by a threaded cap or nut 159.

A spring 160 is interposed between lever 153 and a boss 161 formed upon the wall 102 which urges the lever 153 in a clockwise direction as shown in Figure 3, raising the end of set screw 154 from contact with support 155 or plate 158.

Arranged about the margin of wall 102 are indicia 162, which show the positions of pointer 156 to bring the several steps of plate 158 into position to be contacted by the end of set screw 154. It will be apparent that the plate may be readily removed and a different plate substituted for it whenever it is desired to cut keys corresponding to a different code.

With the apparatus of Figures 3 and 4, keys may be duplicated in precisely the same manner as with the apparatus of the first two figures, it being necessary only to move pointer 156 to the position in which it is shown in Figure 3, pointing to the inscription "Dup.", which indicates duplicate. In this position, the end of set screw 154 contacts the surface of support 155 rather than one of the surfaces of the code plate.

With the key to be duplicated inserted between jaws 125 and 126 of the lowermost vise, and the blank which it is desired to cut between jaws 122 and 123 of the forward vise, the apparatus may be actuated in just the same manner as if the apparatus first described excepting that stop 129 will be held in contact with the key by spring 160 and the carriage must be moved toward the cutter until set screw 154 contacts support 155 to limit the depth of the cuts.

When, however, it is desired to produce a cut corresponding to a given code, a spacer is inserted between jaws 125 and 126, this spacer having notches corresponding to the position in which notches may appear upon keys of the particular type which it is desired to produce. These notches limit the movement of the carriage axially between shaft 118 by indicating to the operator the position along the blank in which he should cut a notch. The depth of the notches is determined by the stop of plate 158 which is brought under the end of set screw 154.

While I have described the illustrated embodiments of my invention in some particularity, obviously many other embodiments will readily occur to those skilled in this art, and I do not therefore limit myself to the precise details shown and described, but claim as my invention all modifications, variations and modifications coming within the scope of the appended claims.

I claim:

1. A portable manually supportable key cutting device comprising a frame having a supporting handle, a lever pivotally connected to the frame, a rotary cutter supported on the frame, driving gearing interposed between the lever and form cutter, and a carriage movably carried by the frame and adapted to be moved axially and radially with respect to the cutter.

2. A portable manually supportable key cutting device comprising a frame having a supporting handle, a lever pivotally connected to the frame, a rotary cutter supported on the frame, driving gearing interposed between the lever and cutter, a carriage movably carried by the frame and adapted to be moved axially and radially with respect to the cutter, and a blank holding device carried by the carriage.

3. A portable manually supportable key cutting device comprising a frame having a supporting handle, a lever pivotally connected to the frame, a rotary cutter supported on the frame, driving gearing interposed between the lever and cutter, and a carriage movably carried by the frame and adapted to be moved axially and radially with respect to the cutter, a blank holding device and an article holding device carried by the carriage.

4. A portable manually supportable key cutting device comprising a frame having a supporting handle, a lever pivotally connected to the frame, a rotary cutter supported on the frame, driving gearing interposed between the lever and cutter, a carriage movably carried by the frame and adapted to be moved axially and radially with respect to the cutter, and a blank holding device and an article holding device carried by the carriage, said devices being in alignment with each other and with the cutter.

5. A portable manually supportable key cutting device comprising a frame having a supporting handle, a lever pivotally connected to the frame, a rotary cutter supported on the frame, driving gearing interposed between the lever and cutter, a carriage movably carried by the frame and adapted to be moved axially and radially with respect to the cutter, a blank holding device and an article holding device carried by the carriage, and a stop carried by the frame arranged to be engaged by an article in the article holding device.

6. A portable manually supportable key cutting device comprising a frame having a supporting handle, a lever pivotally connected to the frame, a rotary cutter supported on the frame, driving gearing interposed between the lever and cutter, a carriage movably carried by the frame and adapted to be moved axially and radially with respect to the cutter, a blank holding device and an article holding device carried by the carriage, a support pivoted to the frame, a stop carried by the support and arranged in position to be engaged by an article in the article holding device, and adjustable means to selectively limit the motion of said support relative the frame.

7. A portable manually supportable key cutting device comprising a frame having a supporting handle, a lever pivotally connected to the frame, a rotary cutter supported on the frame, driving gearing interposed between the lever and cutter, a carriage movably carried by the frame and adapted to be moved axially and radially with respect to the cutter, a blank holding device and an article holding device carried by the carriage, a support pivoted to the frame, a stop carried by the support and arranged in position to be engaged by an article in the article holding device, and adjustable means to selectively limit the motion of said support relative the frame, said means comprising an arm and an adjustable stop member in the path of said arm provided with a plurality of differently spaced surfaces to be engaged by the arm.

8. A portable manually supportable key cutting device comprising a frame having a supporting handle, a lever pivotally connected to the frame, a rotary cutter supported on the frame, driving gearing interposed between the lever and cutter, a carriage movably carried by the frame and adapted to be moved axially and radially with respect to the cutter, a blank holding device and an article holding device carried by the carriage, a support pivoted to the frame, a stop carried by the support and arranged in position to be engaged by an article in the article holding device, and adjustable means to selectively limit the motion of said support relative the frame, said means comprising an arm and an adjustable stop member in the path of said arm provided with a plurality of differently spaced surfaces to be engaged by the arm, said stop member being rotatable and carrying stepped lever engaging surfaces, and indicia for indicating different positions of the stop member.

9. A portable manually supportable key cutting device comprising a frame having a supporting handle, a lever pivotally connected to the frame, a rotary cutter supported on the frame, driving gearing interposed between the lever and cutter, a carriage movably carried by the frame and adapted to be moved axially and radially with respect to the cutter, a blank holding device and an article holding device carried by the carriage, a support pivoted to the frame, a stop carried by the support and arranged in position to be engaged by an article in the article holding device, and adjustable means to selectively limit the motion of said support relative the frame, said means comprising an arm and an adjustable stop member in the path of said arm provided with a plurality of differently spaced surfaces to be engaged by the arm, said stop member being rotatable and carrying stepped lever engaging surfaces, and indicia for indicating different positions of the stop member, said stepped surfaces being formed in a piece releasably secured to said stop member.

10. A portable manually supportable key cutting device comprising a frame having a supporting handle, a lever pivotally connected to the frame, a rotary cutter supported on the frame, driving gearing interposed between the lever and cutter, a carriage movably carried by the frame and adapted to be moved axially and radially with respect to the cutter, a blank holding device and an article holding device carried by the carriage, a support pivoted to the frame, a stop carried by the support and arranged in position to be engaged by an article in the article holding device, and adjustable means to selectively limit the motion of said support relative the frame, said means comprising an arm and an adjustable stop member in the path of said arm provided with a plurality of differently spaced surfaces to be engaged by the arm, a contact adjustable carried by said arm, said stop member being rotatable and carrying stepped lever engaging surfaces, and indicia for indicating different positions of the stop member.

11. A portable manually supportable key cutting device comprising a frame having a supporting handle, a lever pivotally connected to the frame, a rotary cutter supported on the frame, driving gearing interposed between the lever and cutter, a carriage movably carried by the frame and adapted to be moved axially and radially with respect to the cutter, a blank holding device and an article holding device carried by the carriage, a support pivoted to the frame, a stop carried by the support and arranged in position to be engaged by an article in the article holding device, and adjustable means to selectively limit the motion of said support relative the frame, said means comprising an arm and an adjustable stop member in the path of said arm provided with a plurality of differently spaced surfaces to be engaged by the arm, said stop member being rotatable and carrying stepped lever engaging surfaces, indicia for indicating different positions of the stop member, and resilient means urging the arm out of contact with said stop member.

12. A portable manually supportable key cutting device comprising a frame having a supporting handle, a lever pivotally connected to the frame, a rotary cutter supported on the frame, and driving gearing interposed between the lever and cutter, a shaft fixed to the frame, a carriage pivoted on said shaft and movable axially therealong, and a blank holding device and a pattern holding device on said carriage.

13. A portable manually supportable key cutting device comprising a frame having a supporting handle, a lever pivotally connected to the frame, a cutter supported on the frame, driving gearing interposed between the lever and cutter, a carriage movably carried by the frame and adapted to be moved axially and radially with respect to the cutter, and a blank holding device carried by the carriage.

FRANK R. COLLINS.

CERTIFICATE OF CORRECTION.

Patent No. 2,171,684.  September 5, 1939.

FRANK R. COLLINS.

It is hereby certified that error appears in the printed specification of the above numbered patent requiring correction as follows: Page 1, first column, line 40, for "key to the" read key to be; page 2, first column, line 3, for "jew 25" read jaw 25; line 37, for the reference numeral "28" read 18; same page, second column, line 64, claim 1, after "rotary" insert form; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.